US011461787B1

(12) United States Patent
Riley

(10) Patent No.: US 11,461,787 B1
(45) Date of Patent: Oct. 4, 2022

(54) INTENTION IDENTIFICATION IN ELECTRONIC DOCUMENTS

(71) Applicant: United Services Automobile Association (USAA), San Antonio, TX (US)

(72) Inventor: Timothy L. Riley, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 348 days.

(21) Appl. No.: 15/443,200

(22) Filed: Feb. 27, 2017

(51) Int. Cl.
  *G06Q 30/00* (2012.01)
  *G06F 16/93* (2019.01)
  *G06F 16/33* (2019.01)

(52) U.S. Cl.
  CPC ....... *G06Q 30/016* (2013.01); *G06F 16/3344* (2019.01); *G06F 16/93* (2019.01)

(58) Field of Classification Search
  CPC .......... G06F 17/3089; G06F 17/30702; G06F 17/30979; G06F 17/30011; G06F 17/30761; G06F 17/277
  See application file for complete search history.

(56) References Cited

U.S. PATENT DOCUMENTS

| | | | | |
|---|---|---|---|---|
| 5,371,807 A | * | 12/1994 | Register | G06F 16/353 382/159 |
| 10,002,122 B2 | * | 6/2018 | Makino | G06Q 40/04 |
| 2004/0243417 A9 | * | 12/2004 | Pitts, III | G06Q 10/06 704/276 |
| 2010/0094844 A1 | * | 4/2010 | Cras | G06F 40/30 707/705 |
| 2014/0119531 A1 | * | 5/2014 | Tuchman | H04M 3/5166 379/265.09 |
| 2014/0270108 A1 | * | 9/2014 | Riahi | H04M 3/4936 379/88.01 |
| 2015/0066479 A1 | * | 3/2015 | Pasupalak | G06F 40/20 704/9 |
| 2017/0116177 A1 | * | 4/2017 | Walia | G06F 17/279 |

OTHER PUBLICATIONS

N. Pahal, S. Chaudhury, V. Gaur, B. Lall and A. Mallik, "Detecting and Correlating Video-Based Event Patterns: An Ontology Driven Approach," 2014 IEEE/WIC/ACM International Joint Conferences on Web Intelligence (WI) and Intelligent Agent Technologies (IAT), pp. 438-445, doi: 10.1109/WI-IAT.2014.68. (Year: 2014).*

* cited by examiner

*Primary Examiner* — Mehmet Yesildag
(74) *Attorney, Agent, or Firm* — Fletcher Yoder, P.C.

(57) ABSTRACT

Methods, systems, and apparatus, including computer programs encoded on a computer storage medium, for receiving an electronic text document. Identifying a context of the document based on mapping text from the document to entries in a plurality of concept libraries. Determining an intersection between a first entry in a first of the plurality of concept libraries and a second entry in a second of the plurality of concept libraries. Identifying a relationship between at least two concepts included in the document based on the intersection between the first entry and the second entry. Determining an intent of the document based on the context and the relationship between the at least two concepts. Automatically routing the document for further processing based on the determined intent.

19 Claims, 5 Drawing Sheets

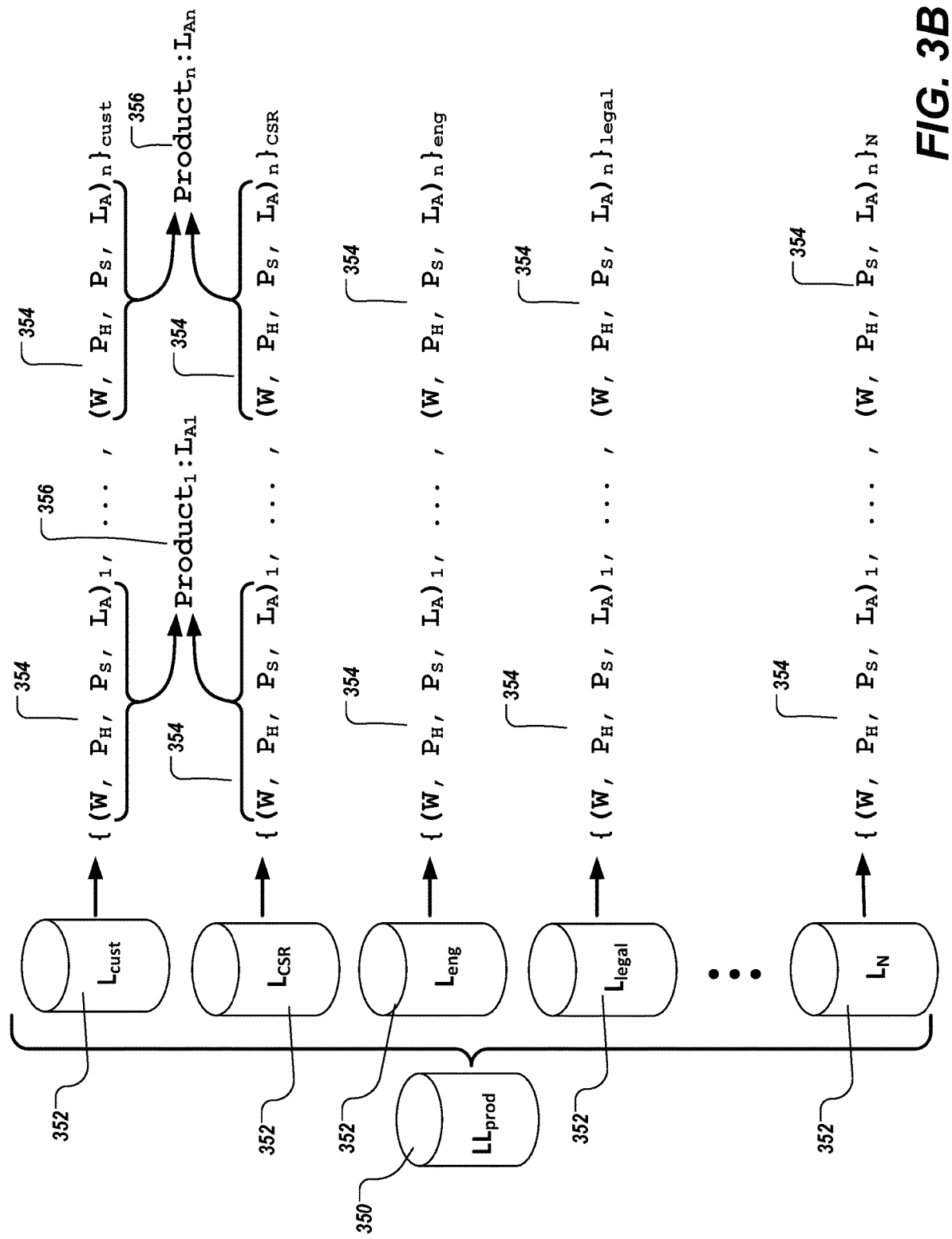

INTENTION IDENTIFICATION IN ELECTRONIC DOCUMENTS

BACKGROUND

Various individuals may convey similar abstract concepts using different words and phrases based on each individual's pre-dispositions and manners of thinking about the concepts. Determining an intention or purpose of a document based on abstract concepts becomes difficult and imprecise using traditional methods due to the differing ways that various authors of documents think about and describe similar topics. Consequently, document processing systems categorize or route by documents based on criteria other than author intent or purpose.

SUMMARY

This specification relates to identifying an intent of electronic textual documents. More specifically, this specification relates to identifying an intent of electronic textual documents and routing the documents based on the identified intent.

In general, innovative aspects of the subject matter described in this specification can be embodied in methods that include the actions of receiving an electronic text document. Identifying a context of the document based on mapping text from the document to entries in a plurality of concept libraries. Determining an intersection between a first entry in a first of the plurality of concept libraries and a second entry in a second of the plurality of concept libraries. Identifying a relationship between at least two concepts included in the document based on the intersection between the first entry and the second entry. Determining an intent of the document based on the context and the relationship between the at least two concepts. Automatically routing the document for further processing based on the determined intent. Other implementations of this aspect include corresponding systems, apparatus, and computer programs, configured to perform the actions of the methods, encoded on computer storage devices.

In a second aspect the subject matter describe in this specification can be embodied in an electronic document routing system that includes a data store for storing data, means for storing a plurality of context entries for a plurality of lexicons, and one or more processors. The one or more processors are configured to interact with the data store and the means for storing the plurality of context entries for the plurality of lexicons. The one or more processors are configured to perform operations that include receiving an electronic text document. Identifying a context of the document using the means for storing a plurality of context entries for a plurality of lexicons. Determining an intersection between a first entry in a first concept library and a second entry in a second concept library. Identifying a relationship between at least two concepts included in the document based on the intersection between the first entry and the second entry. Determining an intent of the document based on the context and the relationship between the at least two concepts. Automatically routing the document for further processing based on the determined intent.

These and other implementations can each optionally include one or more of the following features.

In some implementations, automatically routing the document includes routing the document to a customer service representative qualified to address the intent of the document.

In some implementations, automatically routing the document includes routing the document to an interactive response system.

Some implementations include identifying a product or services that is ancillary to the intent of the document and automatically routing the document to a customer service representative qualified to offer the product or service.

In some implementations, the intersection is determined based on association mapping data that indicates an association between the first entry and the second of the plurality of concept libraries.

In some implementations, identifying the relationship includes using results of a textual analysis of the document to determine the relationship between a first concept conveyed by the first entry and a second concept conveyed by the second entry.

Some implementations include providing a notification that explains the intent of the document for display on a workstation of a customer service representative.

Some implementations include providing a notification that explains a concept conveyed by a term or phrase in the document for display on a workstation of a customer service representative.

In some implementations, mapping text from the document to entries in a plurality of concept libraries includes identifying one or more words, phrases, or patterns used within the document, the one or more words, phrases, or patterns based on a lexicon, and mapping the one or more words, phrases, or patterns to a concept intended to be conveyed by the one or more words, phrases, or patterns according to the lexicon.

In some implementations, each of the plurality of concept libraries include at least one lexicon having a plurality of context entries, where each context entry includes a set of one or more words, phrases, or patterns that are mapped to at least one concept intended to be conveyed by the set of one or more words, phrases, or patterns of the respective context entry.

In some implementations, the document is a chat message or an e-mail.

Some implementations include identifying a product or services that is ancillary to the intent of the document, and providing an advertisement related to the product or service for display on a user computing device.

Particular implementations of the subject matter described in this specification can be implemented so as to realize one or more of the following advantages. Implementations may enable efficient and consistent routing of electronic textual documents across various lexicons. Implementations may improve the accuracy with which routing systems route electronic textual documents. Implementations may enable document routing systems to make more efficient use of computing resources such as network bandwidth, processing resources, and data storage resources. Implementations may improve the accuracy with which automated customer service computer systems fulfill customer requests.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3B depicts a graphical representation of an example concept library

Like reference numbers and designations in the various drawings indicate like elements.

DETAILED DESCRIPTION

Implementations of the present disclosure generally identify intentions conveyed in electronic text documents. More particularly, implementations of the present disclosure identify intentions conveyed in electronic text documents and route the documents according to the identified intentions. For example, natural language processing can be used in conjunction with a set of libraries to identify the intent or purpose of a document. Text in a document can be mapped to entries in context libraries to determine a general context of a document. Library entries that were triggered in determining the context can be used to determine relationships between concepts discussed in the text of the document. An author's intent of the document can be determined based on the general context in view of the identified relationships between concepts.

The document can be routed for appropriate additional processing based on the determined intent. For example, in a customer service system chat or e-mail messages can be routed to appropriate customer service representatives or interactive response systems based on the identified intentions of the messages. Routing messages based on intentions of documents may improve the accuracy with which the documents are routed. In other words, once the intention of a document is identified, a document routing system can route the document to an appropriate representative or system more accurately than, for example, routing based on other criteria such as an e-mail subject line or a webpage from which a chat message originates. Moreover, improvements in accurately routing messages may improve the efficiency of document routing systems. For example, as documents are routed more accurately, a document routing system may make more efficient use of network bandwidth (e.g., as less documents need to be re-routed), system processing resources, system data storage resources, or a combination thereof.

Figure 1:
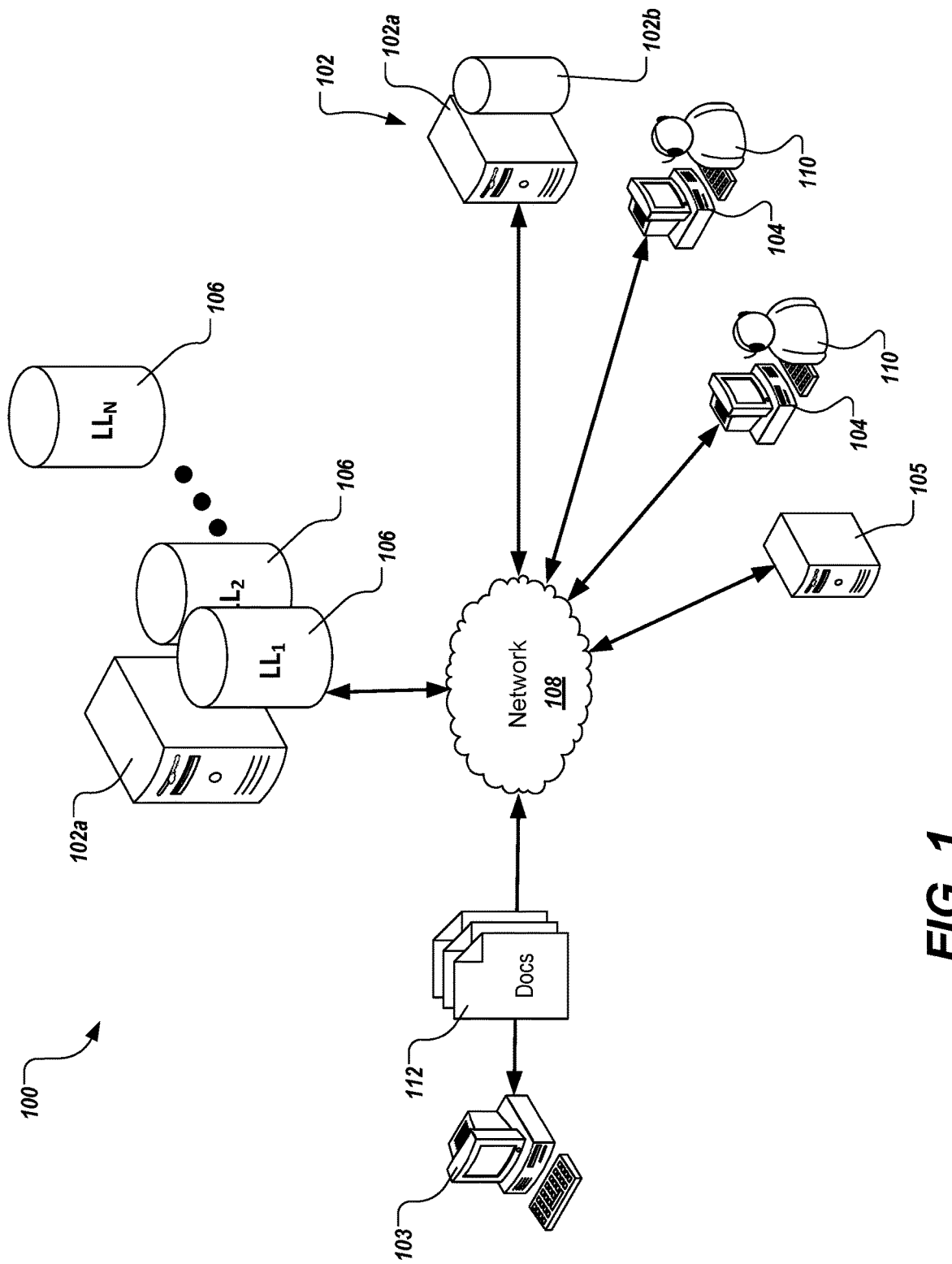
FIG. 1 depicts an example system in accordance with implementations of the present disclosure.

FIG. 1 depicts an example system 100 that can execute implementations of the present disclosure. The example system 100 includes computing system 102 in communication with user computing device 103, workstations 104, interactive response system 105, and concept libraries 106 through a network 108. The computing system 102 can include a computing device 102*a* and computer-readable memory provided as a persistent storage device 102*b*, and can represent various forms of server systems including, but not limited to, a web server, an application server, a proxy server, a network server, or a server farm. User computing device 103 can be any type of user computing device including, but are not limited to, one or more desktop computers, laptop computers, notebook computers, tablet computers, and other appropriate devices.

A workstation 104 can include one or more computing devices. The computing devices can be any type of computing device with which a customer service representative (CSR) 110 can conduct communications with customers and access information related to customer requests (e.g., customer account information, marketing information, call technical support information, product information and/or service information). Computing devices may include, but are not limited to, one or more desktop computers, laptop computers, notebook computers, tablet computers, and other appropriate devices.

Interactive response system 105 can be an automatic customer support system that can interact with customers to, for example, answer questions, provide technical support, accept product orders and exchanges, or make changes to a customer's profile, products (e.g., bank accounts or insurance policies), or pending product orders. Interactive response system 105 can be, but is not limited to, an interactive voice response system, an interactive chat system, a web-interface, an e-mail response system. Interactive response system 105 can be implemented as, for example, a web server, an application server, a proxy server, a network server, or a server farm.

Network 108 can include a large network or combination of networks, such as a local area network (LAN), wide area network (WAN), the Internet, a cellular network, a satellite network, one or more wireless access points, or a combination thereof connecting any number of mobile clients, fixed clients, and servers.

As described in more detail below in reference to FIG. 2, each concept library 106 includes a group of related concepts and contextual lexicon entries related to each concept. A concept library 106 maps one or more different user lexicons into a common set of concepts defined within the library 106. Concept libraries 106 may define concept groups including, but not limited to, products, product features, lines of business, business organizational units, communication channels (e.g., telephone, internet, kiosk, etc.), computer systems/devices, application software, life events, locations, vehicle types, military concepts, or other appropriate concepts of interest. In addition, concept libraries 106 can include association mapping data that represents associations between concepts defined in the library and one or more other libraries. For example, the association mapping data may represent common or possible associations between a concept entry in one library and concepts included in one or more other libraries. For example, a product concept such as automobile insurance may be commonly associated with concepts (e.g., vehicle types) defined in a vehicle concept library.

In some examples, one or more of the concept libraries 106 may be stored on the persistent storage device 102*b* of computing system 102. In some examples, the concept libraries 106 may be stored in one or more databases on other persistent storage devices accessible to computing system 102 through network 108. In some implementations, the concept libraries 106 may be stored in one or more cloud databases on other persistent storage devices accessible to computing system 102 through network 108.

Computing system 102 can use the concept libraries 106 to automatically and consistently identify an author's intention (e.g., purpose) conveyed in an electronic document 112. Computing system 102 can route the document 112 based on the intention identified within the documents 112. For example, computing system 102 can accurately identify intentions conveyed within the document notwithstanding specific user lexicons used within each document to describe various concepts related to the intention. Documents 112 may include any type of electronic text document, including but not limited to, word processor files, portable document files, e-mails, chat conversations, speech to text transcriptions, or user text entry forms of websites, for example.

For example, computing system 102 may receive a chat message from user computing device 103. The chat message may be from a customer requesting help with their auto insurance policy. For example, the chat message may state:

"I have recently pcs'd from san diego to norfolk and am trying to add a bmw to my insurance that I will be purchasing tomorrow. The website is telling me that my vin is wrong when I try to enter it."

Computing system 102 may use the libraries 106 to identify various concepts within the chat message. Computing system 102 can use the concepts to identify the context of the message. For example, a military lexicon of a life event library may indicate that the term "pcs'd" indicates a move, a vehicle type library may indicate that the term "bmw" is an automobile, a location library may indicate that "san diego" and "norfolk" are locations in California and Virginia, respectively, and a product library may indicate that the pattern of terms "bmw insurance" are relevant to an automobile insurance policy. Based on the identified concepts within the chat message, computing system 102 can identify that a general context of the message is related to the customer's automobile insurance policy.

Computing system 102 can identify intersections between the concepts based on the association mapping data, and use the intersections to determine relationships between the concepts. For example, the auto insurance concept can include association data indicating that it should be associated with entries in the vehicle type library and the location library (e.g., because auto insurance policies vary by state). The move concept can include association data indicating that it should also be associated with entries in the location library. Thus, computing system 102 may identify an intersection between the "insurance," the type of automobile ("BMW"), and the two locations ("San Diego" and "Norfolk") mentioned in the chat message. Computing system 102 may also identify an intersection between the move ("pcs'd") and the two locations ("San Diego" and "Norfolk") mentioned in the chat message.

Computing system 102 can use textual analysis techniques (e.g., grammar parsing and/or part-of-speech tagging analysis) to determine relationships between the intersecting concepts. Textual analysis techniques can include, but are not limited to, parser algorithms (e.g., an Early parser or a Coke-Younger-Kasami algorithm), natural language processing algorithms, stemming algorithms (e.g., a Porter and Lancaster stemmer or a Lancaster stemming algorithm), a tree and dependency parser (e.g., Stanford Parser), or a combination thereof.

For example, computing system 102 may determine that the customer is currently in the state of Virginia because the text of the message indicates that the move ("pcs'd") was from San Diego to Norfolk. Further, computing system 102 can then determine a relationship between the move concept and the two locations. Specifically, for example, computing system 102 can determine that the move between San Diego and Norfolk was a move from California to Virginia. In some implementations, a dynamic relationship, such as a move between two locations, can be represented as a vector indicating that the relationship between a concept (e.g., the move) changes between two or more other concepts (e.g., locations in California and Virginia). For example, the vector may indicate the direction of the change (e.g., the move) as being a change in relationship with one concept (e.g., a location in California) to a relationship with another a concept (e.g., a location in Virginia).

Computing system 102 can further apply the relationships between the move and the locations to the intersections of the locations with the auto insurance. For example, based on the determined relationship between the move and the two locations, computing system 102 can determine that because the move was "to" Virginia, the location concept of the state of Virginia is likely more relevant to the automobile insurance concept than California. In other words, the computing system 102 can disambiguate the intersections of the automobile insurance with the two locations to identify the more appropriate location for ultimately determining the intent of the message.

Computing system 102 can determine the customer's intent of the chat message based on the context (auto insurance) and the relationships between the concepts that occur in the message. For example, having determined that the general concept of the message is related to auto insurance, the computing system 102 can use the relationships to determine the customer's intent with respect to the auto insurance. The relationships indicate that the customer has moved from California to Virginia and the automobile insurance association mapping data indicates that automobile insurance is associated with the customers' location (e.g., the user's state). Thus, computing system 102 can determine that the intent of the customer's message is to related to updating their automobile insurance policy for a new state, Virginia.

Computing system 102 can then route the chat message to an appropriate CSR 110 or an appropriate interactive response system 105 based on the determined intent. For example, the computing system 102 can route the chat message to a workstation 104 of a CSR 110 who has an automobile insurance sales license in Virginia. In some implementations, computing system 102 can route the message to multiple CSRs 110. For example, computing system 102 also identified that the customer has used military lexicon to indicate a move (e.g. "pcs'd"). Therefore, the computing system 102 may route the customer's chat message to a CSR 110 who is trained to address other issues related with a military move, so that CSR 110 can offer additional assistance to the customer once the first CSR 110 addresses the customer's automobile insurance questions.

In some implementations, computing system 102 can route the chat message to an interactive response system 105. For example, after determining the intent of the chat message, the computing system 102 can determine whether or not the intent is something that an interactive response system 105 can perform. If so, then computing system 102 can route the chat message to an appropriate interactive response system 105. If not, then computing system 102 can route the chat message to the workstation 104 of an appropriate CSR 110.

In some implementations, computing system 102 can distinguish between multiple parties and/or contexts within a single document and different intentions expressed within the document with respect to the different parties/contexts. For example, a customer's chat message may refer to a first intention with respect to himself and another intention with respect to a family member. For instance, an e-mail message from a customer may state "I am PCS'ing to Fort Carson but my family is moving to Texas and need to update our automobile insurance policies." Computing system 102 can identify the first party as the customer and the second party as the customer's family. Furthermore, using the processes described herein, computing system 102 can determine the customer's intention with respect to each party. For example, computing system 102 may determine that the customer intends to update an insurance policy on one of the customer's vehicles to a Colorado policy (e.g., the location of Fort Carson) and an insurance policy on another one of the customer's vehicles to a Texas policy for the customer's family.

Figure 2:
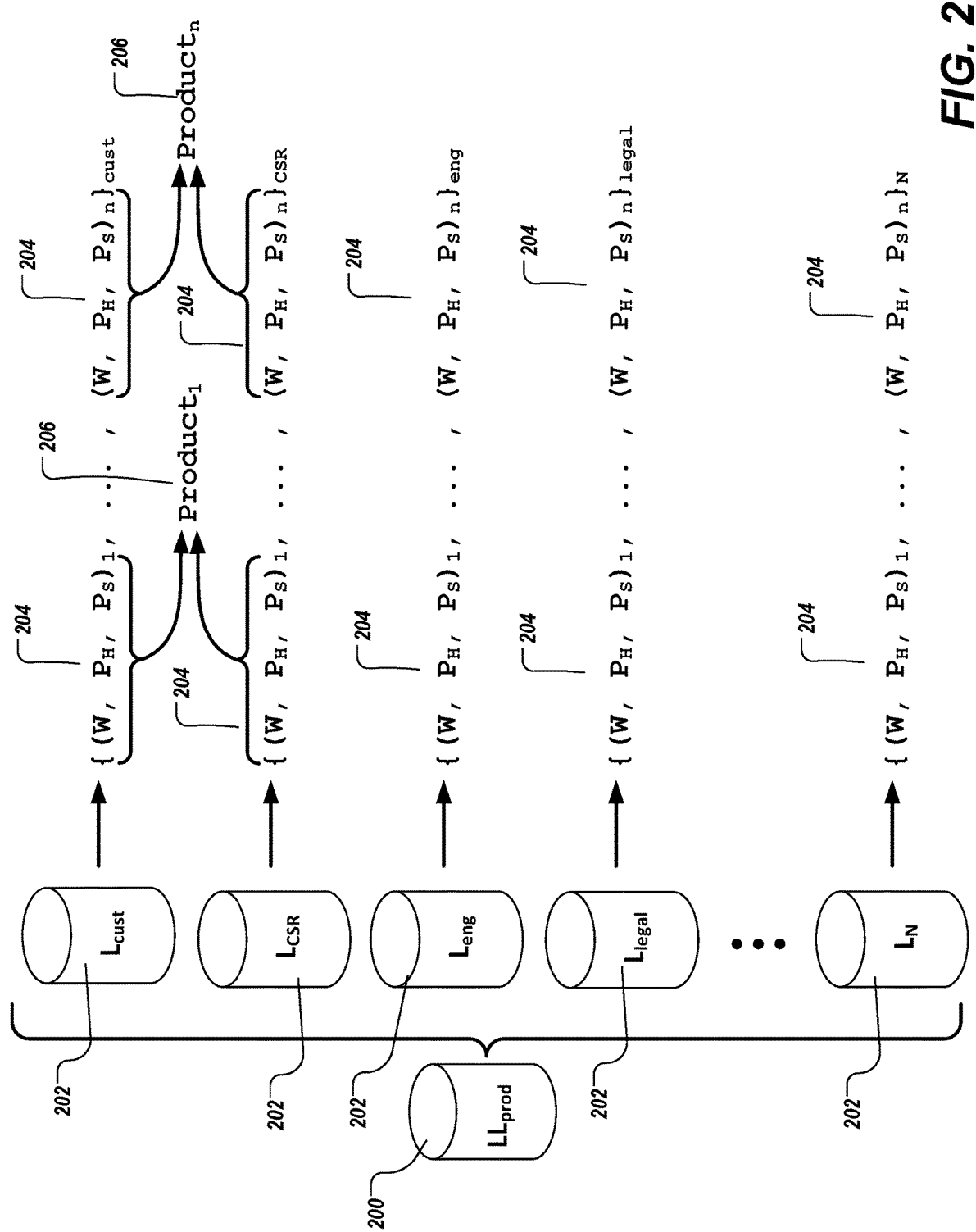
FIG. 2 depicts a graphical representation of an example concept library.

FIG. 2 depicts a graphical representation of an example concept library 200. As noted above, concept libraries 200 may be used (e.g., by computing system 102) to map concepts or groups of concepts to combinations of words, phrases and/or patterns of words and phrases used within different lexicons to describe the similar or the same concepts. For example, a library 200 may be generated to map words, phrases, or patterns of words and phrases used by customers (e.g., a lexicon) to describe various products offered by a business to the specific products (e.g., the concepts). Further, the various words, phrases, or patterns of words and phrases used by members of a legal department to describe the same set of products may be different from those used by the customers. Thus, the library 200 also may map words, phrases, or patterns of words and phrases used by legal staff (e.g., another lexicon) to describe the same products to the specific products. In some examples, a library 200 may be generated to map multiple different lexicons to any particular group of concepts including, but not limited to, products, product features, lines of business, business organizational units, communication channels, computer systems/devices, application software, life events, locations, vehicle types, military concepts, or other appropriate concepts.

More specifically, a concept library 200 includes one or more lexicons 202, each of which includes multiple context entries 204. Each context entry 204 may include a set of one or more words (W), phrases ($P_H$), patterns ($P_S$), or any combination of the three that may be used to describe a particular concept 206 in the related lexicon 202 (e.g., a customer lexicon). In other words, the lexicons 202 map various sets of words, phrases, and patterns used by speakers of the particular lexicon to concepts 206 that those words phrases, or patterns are intended, by users of the lexicon, to convey. Furthermore, each library may map the various lexicons 202 to a specific group of concepts 206 (e.g., products, product features, lines of business, etc.).

For example, lexicons 202 may be defined to map the various words, phrases, and patterns that are used by different groups of people (e.g., groups of people in different departments within an organization such as a business) to convey similar concepts 206 (e.g., products offered by the business). Lexicons 202 may include, but are not limited to, a customer lexicon ($L_{cust}$), a customer service representative (CSR) lexicon ($L_{CSR}$), an engineering department lexicon ($L_{eng}$), and a legal department ($L_{legal}$).

For example, FIG. 2 depicts an exemplary concept library 200 for a line of products ($LL_{prod}$), such as, for example, financial products. Products (concepts 206) defined in the product library ($LL_{prod}$) may include, for example, consumer loan, credit card, auto insurance policy, and home insurance policy. Taking the credit card as an example, when discussing a credit card, customers may tend to refer a business's credit card products as a "charge card," "credit card," "creditcard," or "payment card," for example. Referring to the same credit card product, customer service representatives may refer to the credit card products as "credit card," "mastercard," "master card," "visa," "amex," or "American Express." Referring again to the same credit card products, other groups (e.g., legal staff, engineers, and marketing staff) may use yet other words, phrases, or patterns to describe the products. Therefore, the product library ($LL_{prod}$) includes each set of words, phrases, and patterns in corresponding context entries 204 (e.g., context entry (W, $P_H$, $P_s$)$_1$ for each respective lexicon 202 (e.g., $L_{cust}$-$L_N$), where the first context entry (W, $P_H$, $P_s$)$_1$ for each lexicon describes a first concept 206 (e.g., credit cards or products), and the nth context entry (W, $P_H$, $P_s$)$_n$ for each lexicon describes an nth concept 206 (e.g., product$_n$).

In some implementations, a concept library 200 may include only one lexicon 202. In such an implementation the various words, phrases, and patterns used by each different lexicon to describe a particular concept may be grouped together in a single context entry 204 and mapped to the particular concept. In other words, the context entries 204 for each different lexicon may be combined into a single entry as opposed to being divided into separate contextual entries, one for each different lexicon, as described above.

In some implementations, libraries 200 may be updated as the words, phrases, and patterns used within one or more lexicons to describe particular concepts change. For example, one or more computing systems may monitor changes in each lexicon and update corresponding libraries as appropriate. In some implementations, a library 200 may be updated to modify, add, or remove various concepts defined within the library. For example, as products change, new products are offered, and old products are discontinued.

In some implementation, one or more lexicons may be unique to a particular organization, for example, a business. The lexicon may represent words or phrases used internally by the business to describe products, product features, lines of business, and other business affairs in a manner that maintains confidentiality of the businesses internal processes.

Figure 3A:
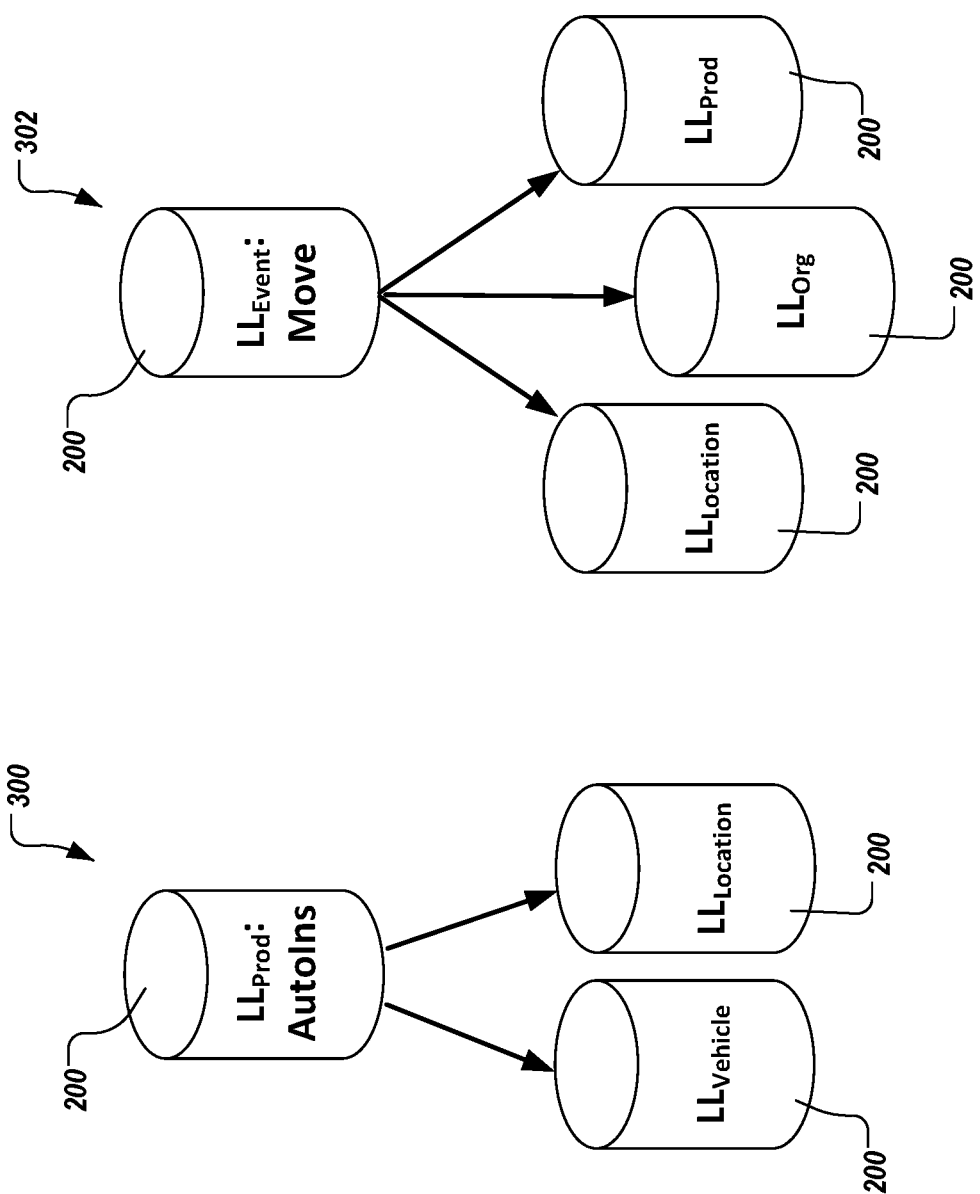
FIG. 3A depicts graphical representations of example associations mappings between concept libraries.

FIG. 3A depicts graphical representations of example association mappings 300 and 304 between concept libraries. Mapping 300 illustrates example libraries 200 that may be associated with an automobile insurance concept entry of a products library ($LL_{Prod}$). For instance, as illustrated in the example chat message discussed above, the concept of automobile insurance is expected to be associated with a vehicle. Accordingly, the concept entry for automobile insurance in the products library may include data indicating that words or phrases in a text document are expected to be associated with other words or phrases related to an automobile which can be found in the vehicle library ($LL_{Vehicle}$). Similarly, the concept of automobile insurance is expected to be associated with a location because automobile policy requirements vary by state. Accordingly, the concept entry for automobile insurance in the products library also may include data indicating that words or phrases in a text document are expected to be associated with other words or phrases related to locations which can be found in the vehicle library ($LL_{Location}$).

Mapping 302 illustrates example libraries 200 that may be associated with a move concept entry of a life event library ($LL_{Event}$). For instance, as illustrated in the example chat message discussed above, the concept of a move life event is expected to be associated with a one or more locations. Accordingly, the concept entry for move life event in the life event library also may include data indicating that words or phrases in a text document are expected to be associated with other words or phrases related to locations which can be found in the location library ($LL_{Location}$). Similarly, the concept of a move life event also may be expected to be associated with one or more products. For example, during a move a customer may commonly update insurance products such as automobile insurance, renter's insurance, homeowner's insurance, addresses for bank accounts, or a combination thereof. Accordingly, the concept entry for a move life event in the life event library may include data indicating that words or phrases in a text document are expected to be associated with other words or phrases related to products which can be found in the products library ($LL_{prod}$). Furthermore, the concept of a move life event also may be expected to be associated with a business group. For example, a customer service center may have a business group that specializes in helping customers manage updating documents and accounts when a customer moves. Accordingly, the concept entry for a move life event in the life event library may include data indicating that the move concept is associated with a particular business group which can be found in the business organization library ($LL_{Org}$).

FIG. 3B depicts a graphical representation of an example concept library 350 that includes library association mapping data ($L_A$). FIG. 3B depicts an exemplary concept library 350 for a line of products ($LL_{prod}$), similar to the concept library 200 discussed above in reference to FIG. 2. Concept library 350 includes one or more lexicons 352, each of which includes multiple context entries 354. Each context entry 354 may include a set of one or more words (W), phrases ($P_H$), patterns ($P_S$), or any combination thereof that may be used to describe a particular concept 356 in the related lexicon 352 (e.g., a customer lexicon). In some examples, the context entries 354 can include association data ($L_A$) in addition to the words (W), phrases ($P_H$), or patterns ($P_S$). The association data ($L_A$) represents associations between a particular concept entry of a library and one or more other libraries. For example, the association mapping data may represent common or possible associations between a concept entry of one library and concepts included in one or more other libraries. In some implementations, the association data ($L_A$) can be associated with a specific context entry 354 in a specific lexicon as represented by $L_A$ appearing in the context entry 354. In some implementations, the association data (e.g., $L_{A1}$ and $L_{An}$) can be associated with the concept 356 represented by the context entries 354 of multiple lexicons 352. For example, a product concept such as automobile insurance is commonly associated with concepts (e.g., vehicle types) defined in a vehicle concept library. Accordingly, association data $L_A$ linking an automobile insurance concept 356 to a vehicle library can be included in context entries 354 related to or included with an automobile insurance concept 356 in a product library ($LL_{prod}$).

Figure 4:
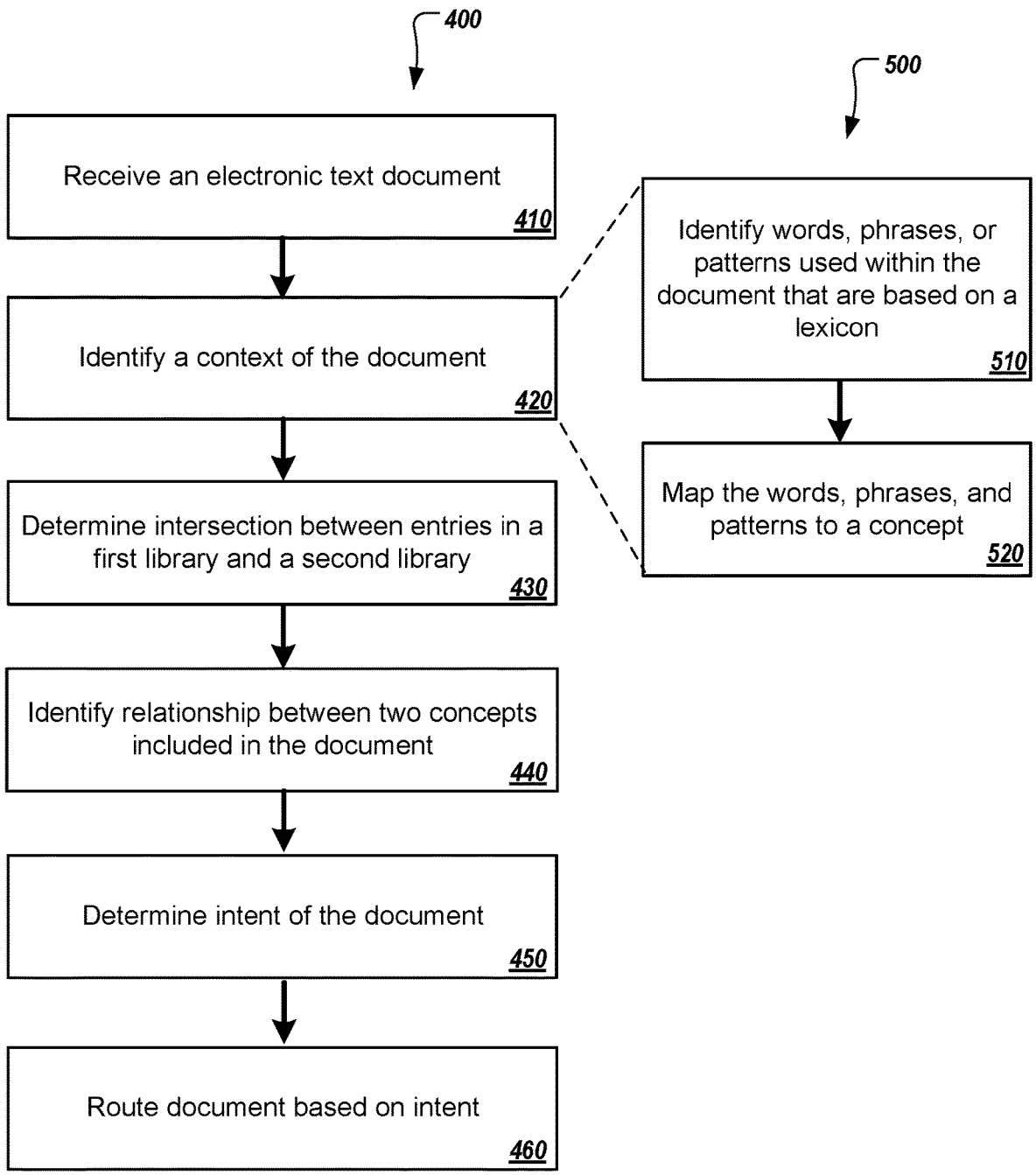
FIG. 4 depicts example processes that can be executed in accordance with implementations of the present disclosure.

FIG. 4 depicts example processes 400 and 500 that can be executed in accordance with implementations of the present disclosure. In some examples, the example processes 400 and 500 can be provided as one or more computer-executable programs executed using one or more computing devices (e.g., computing system 102, as shown in FIG. 1 and described above). In some examples, the process 400 is executed to identified intentions conveyed within an electronic textual document and route the document accordingly based on the identified intentions. In some examples, the process 500 is executed to extract concepts conveyed within one or more electronic textual documents using one or more different lexicons.

A computing system receives an electronic text document (410). Electronic documents may include any type of electronic text document, including but not limited to, word processor files, portable document files, e-mails, chat conversations, speech to text transcriptions, or user text entry forms of web sites, for example. For example, the electronic document may be a chat message or an e-mail from a customer to a customer service center.

The computing system identifies a context of the document (420). For example, the computing system can identify a context of the document by mapping text from the document to concept entries in a plurality of concept libraries. The computing system can determine concepts described in the document by identifying one or more words, phrases, or patterns that are used within the electronic document and that are based on a lexicon (510). For example, a particular word, phrase, or pattern of words may be used within lexicon A to describe concept X, while a different word, phrase or pattern of words may be used within lexicon B to describe the same concept X. For example, the lexicon may be one of a customer lexicon, a military lexicon, a customer service representative lexicon, or a technical staff lexicon. In some examples, known sets of one or more words, phrases, or patterns corresponding to one or more known lexicons may be identified within the electronic document.

The computing system can use a concept library to map the one or more words, phrases, or patterns to a concept intended to be conveyed by the one or more words, phrases, or patterns in the lexicon (520). For example, the concept library may include at least one lexicon having a plurality of context entries. Each context entry of the concept library may include a set of one or more words, phrases, or patterns that are mapped to at least one concept which is intended to be conveyed, according to the respective lexicon, by the set of one or more words, phrases, or patterns that are included in the respective context entry. In some examples, the concept library may be one of a product library, a product feature library, a location library, a vehicle library, a line of business library, or a life events library. In other words, the concept library may map words, phrases, or patterns of words using in one or more lexicons to concept sets that include, but are not limited to, products, product features, geographic locations, vehicle types, lines of business, or life events.

Referring back to step (420), the computing system can identify a general context of the document based on the identified concepts. For example, if the computing system identifies an insurance related concept and a vehicle related concept the general context of the document is likely related to automobile insurance. As another example, if the computing system identifies a fraud related concept and a credit card related concept, the general context of the document is likely related to potential fraudulent use of a credit card.

The computing system determines an intersection between entries in a first library and a second library (430). For example, one or more of library concept entries can include association mapping data that represents associations between the concept entry in the library and one or more other libraries. For example, the association mapping data may represent common or possible associations between a concept entry in one library and concepts included in one or more other libraries. For example, an automobiles insurance concept entry in a product library may include association mapping data indicating that the concept automobile insurance should be associated with a concept entry from a vehicle library such as automobile generally or a specific type, make, or model of automobile.

The computing system identifies a relationship between two concepts included in the document based on the intersection (440). For example, the computing system can use textual analysis techniques to determine relationships between the intersecting concepts. For example, results of the textual analysis can indicate how intersecting concepts are related, changes in relationships between multiple intersecting concepts, types of relationships between concepts, or combinations thereof. For example, as discussed above in reference to FIG. 1, textual analyses results can be used to determine the direction of a move concept between two different location concepts. In some implementations, a dynamic relationship, such as a move between two locations, can be represented as a vector indicating that the relationship between one concept (e.g., a move) changes between two or more other concepts (e.g., locations). For example, a relationship vector may indicate the direction of the change in relationship (e.g., the move) as being a change in relationship with one concept (e.g., a first location) to a relationship with another a concept (e.g., a second location). Accordingly, the relationship vector may indicate a move "from" the first location and a corresponding move "to" the second location. In some implementations, the relationship vector can be used to infer or track a future or potential change between the concepts (e.g. a return from deployment typically follows any deployment) even though it is not been expressly stated.

Moreover, textual analysis results can be used in combination with an established relationship determine another relationship between two or more of the same or different concepts. For example, an established relationship between a first and a second concept can be used to disambiguate or prioritize relationships between a third concept and two or more other concepts. For example, as discussed in the example above in reference to FIG. 1, an established relationship between a move concept and two different location concepts can be used to disambiguate which of the locations is more relevant to another concept such as automobile insurance. That is, after establishing the relationship between the move as being a move from a first location to a second location, the "new" or "to" location of a customer is likely more relevant to an automobile insurance policy.

The computing system determines an intent of the document (450). For example, the computing system can determine an intent of the document based on the context and relationships between concepts. For example, having determined a general concept of a document, the computing system can use the relationships to determine a intent of the user within the context. For example, within a context related to automobile insurance, the computing system can use relationships between a move concept and location concepts to determine that the intent of the document is likely to update an automobile insurance policy due to a customer's move.

The computing system can route the document based on the determined intent (460). For example, the computing system can automatically route the document to a customer service representative or an interactive response system for further processing based on the determined intent. For example, the computing system can route the document to a workstation of CSR who is qualified to address the intentions of the customer who authored the document.

In some implementations, the computing system can determine whether or not the intent of the document is something that an interactive response system can address. If so, then computing system can route the chat message to an appropriate interactive response system. If not, then computing system can route the chat message to the workstation of an appropriate customer service representative. For example, if the computing system determine that the intent of a particular chat messages is to drop an automobile from an auto insurance policy, the computing system can respond to the chat message to confirm the intention. For example, the computing system can send a tailored response such as "It looks like you want to drop the 2014 BMW 320i from your policy, is that correct?"

In some implementations, the computing system can identify products or services that are ancillary to the intent and route the document to a CSR or interactive response system to offer the additional products or services to the customer who authored the document. For example, ancillary services to updating automobile insurance due to a move may include additional services related to a move including, for example, updating a customer's address, scheduling movers, updating renter's or homeowner's insurance policies, finding a real estate agent, or obtaining a mortgage. Therefore, the computing system can route the document to a second CSR or interactive response system to offer such ancillary services to a customer after the customer's intention is addressed (e.g., the automobile insurance policy is updated).

In some implementations, the computing system can provide an advertisement to the customer for the ancillary products or services while the user is waiting to be connected with the first CSR or interactive response system. For example, the advertisement can be an advertisement in a chat window, an advertisement in an e-mail response to the document, or advertisements on a webpage through which the customer sent the document. In some implementations.

In some implementations, the computing system can provide notifications to a CSR who is working with the customer to address the intent of the document so that the CSR can offer the ancillary products or services. For example, the computing system can provide a notification on the CSR's workstation to ask whether the customer would like assistance in updating the customer's address, scheduling movers, updating renter's or homeowner's insurance policies, finding a real estate agent, or obtaining a mortgage.

In some implementations, the computing system can provide notifications to a CSR based on the intent or concepts within the document. That is, the computing system can provide a notification for display on a CSR's workstation. For example, a notification can explain the intent of a chat message to the CSR. A notification can explain a term used to convey a concept to the CSR. For example, the computing system identifies that the document includes terms from a particular or un-common lexicon, the computing system can provide a notification explaining the concept conveyed by the terms. For example, if a customer is a military member a CSR may not familiar with military specific terms. Thus, if the document contains a term such as "pcs" or "pcs," the computing system can provide a notification that the term "pcs" means "permanent change of station" and indicates that the customer has moved or will be moving. As another example, a military member may state that they are "onboard LHD-6." The computing system can provide a notification to a CSR explaining the term "LHD-6" and implications of the customer being "onboard LHD-6." For example, the notification may explain that the customer is likely at sea on an amphibious landing ship that is similar to but smaller than an aircraft carrier and that the customer is, therefore, unreachable by telephone.

In some implementations, the computing system can store data indicating document intent and message context in association with the documents. For example, the stored information can be presented to CSRs if the document (e.g., e-mail or chat message) is referenced at a later time or by other CSRs if the customer's request (e.g., the document) is transferred to different CSRs.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An electronic document routing system comprising:
   a data store for storing data; and
   one or more processors configured to interact with the data store, the one or more processors being further configured to perform operations comprising:
      receiving an electronic text document comprising an electronic mail message or an electronic chat message of a user;
      identifying a first text comprising a first word or a first phrase contained within the electronic text document, wherein the first word or the first phrase is indicative of a first geographic location of a plurality of geographic locations;
      mapping the first text of the electronic text document to a first geographic location entry in a location concept library of a plurality of concept libraries in the data store based on the first geographic location, wherein each concept library of the plurality of concept libraries comprises a plurality of lexicon entries associated with a respective concept group, wherein the location concept library comprises a first set of words, phrases, or both, representative of the plurality of geographic locations, and wherein a first plurality of subsets of the first set of words, phrases, or both, corresponds to the plurality of geographic locations;
      identifying a second text comprising a second word or a second phrase contained within the electronic text document, wherein the second word or the second phrase is indicative of a second geographic location of the plurality of geographic locations;
      mapping the second text of the electronic text document to a second geographic location entry in the location concept library based on the second geographic location;
      mapping a third text of the electronic text document to a product entry in a product concept library of the plurality of concept libraries in the data store, wherein the product concept library comprises a second set of words, phrases, or both, representative of a plurality of products, and wherein a second plurality of subsets of the second set of words, phrases, or both, corresponds to the plurality of products;
      identifying a first location concept of the first text of the electronic text document based on the first geographic location entry and a first location concept group of the location concept library, wherein the first location concept is representative of the first geographic location of the plurality of geographic locations;
      identifying a second location concept of the second text of the electronic text document based on the second geographic location entry and a second location concept group of the location concept library, wherein the second location concept is representative of the second geographic location of the plurality of geographic locations;
      identifying a product concept of the third text of the electronic text document based on the product entry and a product concept group of the product concept library, wherein the product concept is representative of a product of the plurality of products;
      identifying association mapping data from based on the first location concept group, the second location concept group, and the product concept group, wherein the association mapping data comprises one or more expected associations between the first location concept group, the second location concept group, and the product concept group;
      determining an intersection between the first geographic location entry and the second geographic location entry based on association mapping data representing associations between the first location concept group and the second location concept group, wherein the intersection is indicative of a relationship between the first location concept and the second location concept of the electronic text document with respect to the first geographic location entry and the second geographic location entry, and wherein the relationship is indicative of a movement of the user from the first geographic location to the second geographic location;

identifying a context of the electronic text document based on the product concept and the association mapping data;

determining a service to be performed based on the relationship and the context, wherein the service comprises assisting the user with a request related to the product and the movement of the user;

determining an intent of the electronic text document based on the service; and automatically routing the electronic text document for further processing based on the intent to a customer service representative qualified to perform the service.

2. The system of claim 1, wherein the operation comprising automatically routing the electronic text document comprises routing the electronic text document to an interactive response system.

3. The system of claim 1, wherein the operations further comprise:

identifying an additional product that is ancillary to the intent of the electronic text document; and automatically routing the electronic text document to a customer service representative qualified to offer the additional product.

4. The system of claim 1, wherein the operations further comprise providing, for display on a workstation of the customer service representative, a notification that explains the intent of the electronic text document.

5. The system of claim 1, wherein the operations further comprise providing, for display on a workstation of the customer service representative, a notification that is indicative of the first location concept, the second location concept, the product concept, or a combination thereof, conveyed by the electronic text document.

6. The system of claim 1, wherein the operation comprising mapping the first text and the second text of the electronic text document to the first geographic location entry in the location concept library and the second geographic location entry in the location concept library, respectively, comprises:

identifying one or more lexicons associated with the first text and the second text within the electronic text document; and mapping the first text and the second text to the first geographic location entry and the second geographic location entry, respectively, according to the one or more lexicons.

7. The system of claim 1, wherein each location lexicon entry of a plurality of location lexicon entries of the location concept library comprises a first subset of the first plurality of subsets of the words, phrases, or both, that are mapped to at least one location concept of the first location concept group or the second location concept group intended to be conveyed by the first subset.

8. The system of claim 1, wherein the operations further comprise:

identifying an additional product that is ancillary to the intent of the electronic text document; and providing, for display on a user computing device, an advertisement related to the additional product or the service.

9. The system of claim 1, wherein the plurality of lexicon entries of each concept library comprise one or more lexicons related to the respective concept group.

10. The system of claim 1, wherein the plurality of concept libraries comprise the products, product features, lines of business, business organizational units, communication channels, computer systems, application software, life events, the plurality of geographic locations, vehicle types, or a combination thereof.

11. The system of claim 1, wherein the operations further comprise:

determining whether an interactive response system is configured to perform the service;

automatically routing the electronic text document for further processing to the interactive response system in response to determining that the interactive response system is configured to perform the service; and automatically routing the electronic text document for further processing to the customer service representative in response to determining that the interactive response system is not configured to perform the service.

12. The system of claim 11, wherein the interactive response system is configured to provide a tailored response based on the determined intent of the electronic text document.

13. The system of claim 1, wherein determining the intersection between the first geographic location entry and the second geographic location entry based on the association mapping data representing the associations between the first location concept group and the second location concept group comprises using textual analysis techniques to identify the intersection between the first geographic location entry and the second geographic location entry.

14. The system of claim 13, wherein the textual analysis techniques comprise grammar parsing, part-of-speech tagging analysis, or both.

15. The system of claim 1, wherein the plurality of products comprises insurance products, financial products, and banking products.

16. A computer-implemented electronic document routing method executed by at least one processor, the method comprising:

receiving, by the at least one processor, an electronic text document comprising an electronic mail message or an electronic chat message of a user;

identifying, by the at least one processor, a first text comprising a first word or a first phrase contained within the electronic text document, wherein the first word or the first phrase is indicative of a first geographic location of a plurality of geographic locations;

mapping, by the at least one processor, the first text of the electronic text document to a first geographic location entry in a location concept library of a plurality of concept libraries based on the first geographic location, wherein each concept library of the plurality of concept libraries comprises a plurality of lexicon entries associated with a respective concept group, wherein the location concept library comprises a first set of words, phrases, or both, representative of the plurality of geographic locations, and wherein a first plurality of subsets of the first set of words, phrases, or both, corresponds to the plurality of geographic locations;

identifying, by the at least one processor, a second text comprising a second word or a second phrase contained within the electronic text document, wherein the second word or the second phrase is indicative of a second geographic location of the plurality of geographic locations;

mapping, by the at least one processor, the second text of the electronic text document to a second geographic location entry in the location concept library based on the second geographic location;

mapping, by the at least one processor, a third text of the electronic text document to a product entry in a product concept library of the plurality of concept libraries, wherein the product concept library comprises a second set of words, phrases, or both, representative of a plurality of products, and wherein a second plurality of subsets of the second set of words, phrases, or both, corresponds to a plurality of products;

identifying, by the at least one processor, a first location concept of the first text of the electronic text document based on the first geographic location entry and a first location concept group of the location concept library, wherein the first location concept is representative of the first geographic location of the plurality of geographic locations;

identifying, by the at least one processor, a second location concept of the second text of the electronic text document based on the second geographic location entry and a second location concept group of the location concept library, wherein the second location concept is representative of the second geographic location of the plurality of geographic locations;

identifying, by the at least one processor, a product concept of the third text of the electronic text document based on the product entry and a product concept group of the product concept library, wherein the product concept is representative of a product of the plurality of products;

identifying, by the at least one processor, association mapping data from based on the first location concept group, the second location concept group, and the product concept group, wherein the association mapping data comprises one or more expected associations between the first location concept group, the second location concept group, and the product concept group;

determining, by the at least one processor, an intersection between the first geographic location entry and the second geographic location entry based on association mapping data representing associations between the first location concept group and the second location concept group, wherein the intersection is indicative of a relationship between the first location concept and the second location concept of the electronic text document with respect to the first geographic location entry and the second geographic location entry, and wherein the relationship is indicative of a movement of the user from the first geographic location to the second geographic location;

identifying, by the at least one processor, a context of the electronic text document based on the product concept and the association mapping data;

determining a service to be performed based on the relationship and the context, wherein the service comprises assisting the user with a request related to the product and the movement of the user;

determining, by the at least one processor, an intent of the electronic text document based on the service; and automatically routing, by the at least one processor, the electronic text document for further processing based on the intent to a customer service representative qualified to perform the service.

17. The method of claim 16, comprising:

determining, by the at least one processor, whether an interactive response system is configured to perform the service;

automatically routing, by the at least one processor, the electronic text document for further processing to the interactive response system in response to determining that the interactive response system is configured to perform the service; and automatically routing, by the at least one processor, the electronic text document for further processing to the customer service representative in response to determining that the interactive response system is not configured to perform the service.

18. A non-transient computer readable medium storing instructions that, when executed by at least one processor, cause the at least one processor to perform operations comprising:

receiving an electronic text document comprising an electronic mail message or an electronic chat message of a user;

identifying a first text comprising a first word or a first phrase contained within the electronic text document, wherein the first word or the first phrase is indicative of a first geographic location of a plurality of geographic locations;

mapping the first text of the electronic text document to a first geographic location entry in a location concept library of a plurality of concept libraries based on the first geographic location, wherein each concept library of the plurality of concept libraries comprises a plurality of lexicon entries associated with a respective concept group, wherein the location concept library comprises a first set of words, phrases, or both, representative of the plurality of geographic locations, and wherein a first plurality of subsets of the first set of words, phrases, or both, corresponds to the plurality of geographic locations;

identifying a second text comprising a second word or a second phrase contained within the electronic text document, wherein the second word or the second phrase is indicative of a second geographic location of the plurality of geographic locations;

mapping the second text of the electronic text document to a second geographic location entry in the location concept library based on the second geographic location;

mapping a third text of the electronic text document to a product entry in a product concept library of the plurality of concept libraries, wherein the product concept library comprises a second set of words, phrases, or both, representative of a plurality of products, and wherein a second plurality of subsets of the second set of words, phrases, or both, corresponds to the plurality of products;

identifying a first location concept of the first text of the electronic text document based on the first geographic location entry and a first location concept group of the location concept library, wherein the first location concept is representative of the first geographic location of the plurality of geographic locations;

identifying a second location concept of the second text of the electronic text document based on the second geographic location entry and a second location concept group of the location concept library, wherein the second location concept is representative of the second geographic location of the plurality of geographic locations;

identifying a product concept of the third text of the electronic text document based on the product entry and a product concept group of the product concept library, wherein the product concept is representative of a product of the plurality of products;

identifying association mapping data from based on the first location concept group, the second location concept group, and the product concept group, wherein the association mapping data comprises one or more expected associations between the first location concept group, the second location concept group, and the product concept group;

determining an intersection between the first geographic location entry and the second geographic location entry based on association mapping data representing associations between the first location concept group and the second location concept group, wherein the intersection is indicative of a relationship between the first location concept and the second location concept of the electronic text document with respect to the first geographic location entry and the second geographic location entry, and wherein the relationship is indicative of a movement of the user from the first geographic location to the second geographic location;

identifying a context of the electronic text document based on the product concept and the association mapping data;

determining a service to be performed based on the relationship and the context, wherein the service comprises assisting the user with a request related to the product and the movement of the user;

determining an intent of the electronic text document based on the service; and automatically routing the electronic text document for further processing based on the intent to a customer service representative qualified to perform the service.

19. The medium of claim 18, wherein the operations further comprise:

determining whether an interactive response system is configured to perform the service;

automatically routing the electronic text document for further processing to the interactive response system in response to determining that the interactive response system is configured to perform the service; and automatically routing the electronic text document for further processing to the customer service representative in response to determining that the interactive response system is not configured to perform the service.

* * * * *